Dec. 25, 1962     I. G. GULLEY     3,070,125
MANNUALLY OPERATED SUPPLY AND VENT VALVE
Filed Aug. 17, 1959
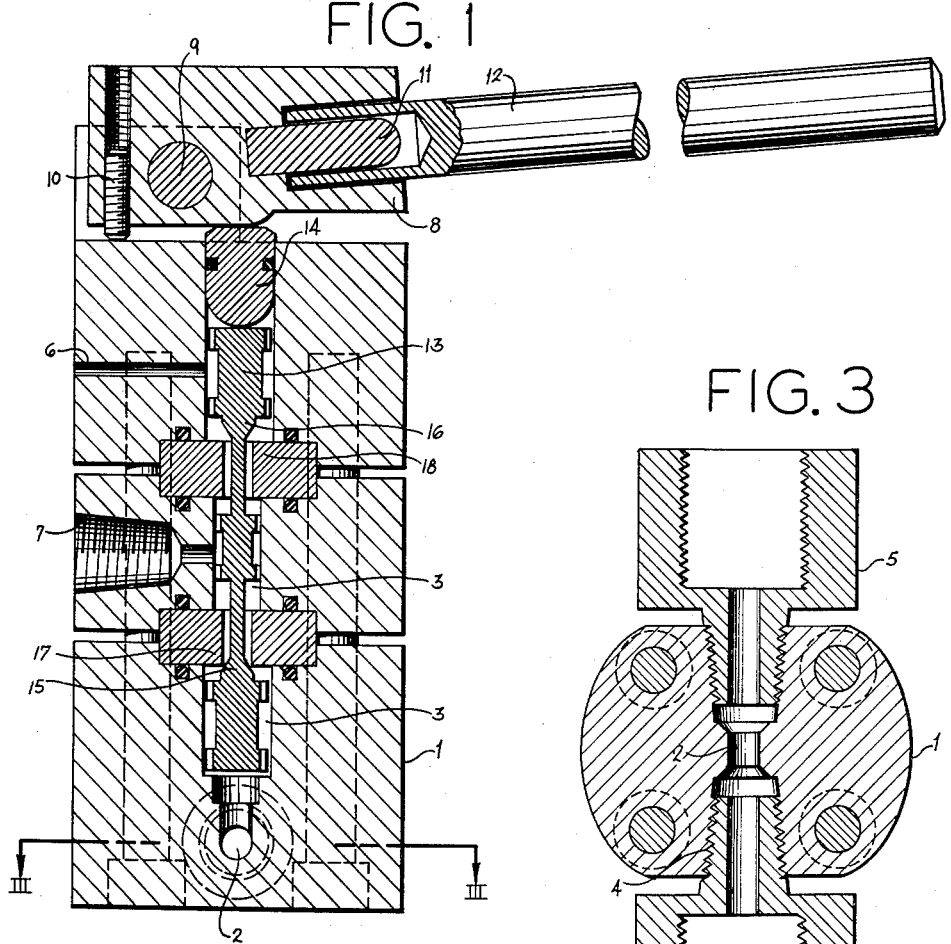
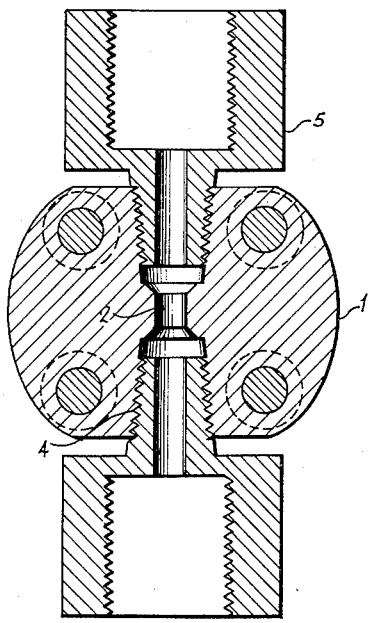
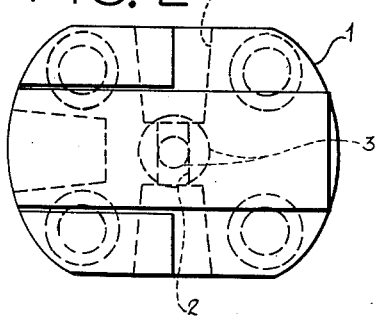
*INVENTOR.*
IRVIN GLENN GULLEY
BY
ATTORNEYS United States Patent Office 3,070,125
Patented Dec. 25, 1962

3,070,125
MANUALLY OPERATED SUPPLY AND
VENT VALVE
Irvin Glenn Gulley, 7 Ovington Square, Knightsbridge,
London SW. 3, England
Filed Aug. 17, 1959, Ser. No. 834,055
1 Claim. (Cl. 137—625.27)

This invention relates to mine blasting and, in particular, to so-called shooting valves for admitting high pressure gas, such as air, to shells which are placed in a shot-hole in the mine face, a shear pin or plate within the shell being adapted to rupture when the admitted gas has built up to a predetermined high pressure of up to 12,000 pounds p.s.i., thus bursting the material away from the face.

Supply header pipes for the compressed gas are usually laid to extend along the face and at intervals shooting valves are provided for diverting air to the shells which are connected to the valves by flexible pipes. Hitherto, such shooting valves have had to be turned on and off as required. However, in view of the very high gas pressures involved, safety reasons make it advisable that there be no risk of prolonged gas supply past each shooting valve after the associated shell has been operated.

According to this invention, the shooting valve comprises a housing for a valve member which is adapted to be operated manually to open a passage in the housing for compressed air or other gas supplied from the header, and means for automatically returning the valve member to a position where it shuts the air passage as soon as manual operating pressure is released.

In this way, it is possible to block very rapidly the flow of high pressure air through the valve.

In the preferred form of the invention manual operation of the valve member is effected by means of a pivoted cam arranged to displace the valve member when turned and adapted to receive a removable handle for being turned manually. The removable connection between the cam and handle is preferably a non-standard one so that unauthorized operation of the cam by means of odd pipe ends or the like is prevented.

The valve member may be double acting, having two faces cooperating with two seatings in the valve housing, one of the valve faces serving to open or shut the flow of compressed air to the aforementioned air passage and the other serving to shut or open respectively communication between the air passage and a vent to atmosphere. The arrangement is preferably such that any undesired compressed air at the shell is also vented to atmosphere through the air passage in the shooting valve.

The preferred means for automatically returning the valve member to shut the air passage are constituted by the high pressure air supply itself.

Other aspects of the invention are described with reference to the accompanying drawing in which:

FIGURE 1 is a sectional elevation of an example of a shooting valve according to the invention for connection to cupro-nickel header pipes;

FIGURE 2 is a plan view thereof with the handle removed; and

FIGURE 3 is a section on the line III—III in FIGURE 1 showing two adaptors for connecting steel header pipes.

The shooting valve comprises a frusto-cylindrical housing 1 which is made in three parts held together by four bolts and having a radial bore 2 in communication with an axial passage 3. The housing is designed to be connected to cupro-nickel air header pipes (not shown) which can be screwed directly into screw threaded enlarged portions of the bore 2. However, as shown in FIGURE 3, adaptors 5 for connecting larger diameter steel pipe headers can be provided.

A radial vent hole 6 and a radial discharge hole 7 open into the passage 3. A flexible pipe (not shown) for supplying air to a blasting shell can be screw threaded into the discharge hole 7.

A cam 8 is pivoted to the housing at 9, an adjustable stop 10 being provided to limit the extent to which the cam can be turned in one direction. One side of the cam 8 is recessed and provided with a plug 11 for receiving a removable operating handle 12.

The cam 8 is adapted to act through a tappet 14 on a double-acting valve member 13 disposed in the passage 3. The valve member has two faces 15 and 16 cooperating with two valve seats 17 and 18, respectively, provided in the housing 1 in a manner so that the valve face 15 can open or shut the flow of compressed air from the bore 2, through the passage 3 to the discharge hole 7 while the other valve face 16 can shut or open respectively communication between the passage 3 and the vent 6.

In use, compressed air header pipes are connected to the portions of the bore 2 (FIGURES 1 and 2) or to the adaptors 5 (FIGURE 3) and a flexible air supply pipe for a blasting shell is connected to the discharge hole 7. The pressure of the air in the bore 2 and the lower part of the passage 3 urges the valve member 13 into a position in which the valve face 15 is closed on the seating 17, the upper part of the passage 3 being vented to atmosphere through the hole 6, as shown in FIGURE 1. When it is desired to charge a shell with compressed air for blasting purposes, the operator inserts the handle 12 in the cam 8 over the plug 11 and depresses the cam so as to displace the valve member 13 downwardly until the valve face 16 closes on its seating 18, the valve face 15 being lifted off the seating 17 simultaneously. Compressed air is thus free to flow to the discharge hole 7 but not to atmosphere. When the blast has taken place at the mine face, or if the shell fails to function, the operator releases the handle whereupon the valve member 13 is automatically returned to the FIGURE 1 position by the air pressure in the bore 2. No further high pressure air can therefore reach the discharge hole 7. In addition, the part of the passage 3 located above the valve face 15 is automatically vented to atmosphere through the hole 6. This latter aspect is very important in cases where the shell has failed to discharge or the operator has become indisposed during the air supply operation because the discharge hole 7 (and thus the shell itself) is also vented to atmosphere through the hole 6, thus making it possible to make operations at the mine face perfectly safe without the fear of compressed air being present near the shell unintentionally.

While the preferred embodiment of the invention has been illustrated and described, it will be understood that changes in the construction may be made within the scope of the appended claims without departing from the spirit of the invention.

What is claimed is:

A valve for interrupting the passage of compressed gas through a high pressure fluid line comprising a three-part valve body having an axial cylindrical bore in communication with a gas inlet, a gas outlet and a vent to the atmosphere, the gas inlet being positioned proximate one end of the valve body and individual to one part of the valve body, the vent to the atmosphere being positioned proximate the other end of the valve body and individual to a second part of the valve body and the gas outlet being positioned intermediate the inlet and the vent and individual to a third part of the valve body, a tappet slidably mounted in said bore and sealing the bore at said other end of the valve body, a pair of cylindrical valve seats in the bore, the first valve seat being positioned between the inlet and the outlet and the second valve seat being positioned between the vent and the outlet, a valve member movable in the axial bore between and beyond the valve seats, the valve member having first and second frustro-conical valve faces connected by a stem passing through the cylindrical valve seat, the valve faces being tapered in the direction of the valve seats and the valve stem being longer than the distance between the valve seats, gas pressure normally urging the valve member away from the gas inlet and the first valve face into closed contact with the first valve seating and also urging the second valve face away from the second valve seating, the gas pressure being the sole means for moving the valve in said direction, manually operated cam means urging the valve member in the opposite direction, said cam means comprising a cam member extending transversely of said axial bore at said other end of the valve body and having a first end, a second end and an intermediate portion, pivot means mounting said first end of said cam member on said valve body, said second end of the cam member being provided with a recess, plug means mounted in said recess adapted to accommodate one end of a removable handle, said intermediate portion of the cam member adapted to contact one end of said tappet, the opposite end of said tappet contacting said valve member, and a handle removably secured to said plug means and adapted to pivot said cam means about said pivot means so that said intermediate portion of the cam means moves said tappet and said valve member axially of said bore in said opposite direction.

References Cited in the file of this patent
UNITED STATES PATENTS

| | | |
|---|---|---|
| 117,438 | Malmstrom | July 25, 1871 |
| 312,724 | Jarboe | Feb. 24, 1885 |
| 688,329 | Osborn | Dec. 10, 1901 |
| 851,235 | Harkins | Apr. 23, 1907 |
| 906,331 | Struble | Dec. 8, 1908 |
| 1,184,365 | Luhrs | May 23, 1916 |
| 1,286,971 | Farr | Dec. 10, 1918 |
| 1,445,380 | Wright | Feb. 13, 1923 |
| 2,539,913 | Koepcke | Jan. 30, 1951 |
| 2,916,047 | Butcher | Dec. 8, 1959 |